United States Patent [19]

Stratynski et al.

[11] 4,200,124

[45] Apr. 29, 1980

[54] VALVE ASSEMBLY

[75] Inventors: Eugene Stratynski, West Chicago; Keith Zukausky, St. Charles, both of Ill.

[73] Assignee: Eaton Corporation, Cleveland, Ohio

[21] Appl. No.: 879,836

[22] Filed: Feb. 21, 1978

[51] Int. Cl.² .......................................... F16K 11/00
[52] U.S. Cl. .................................. 137/885; 137/861; 137/887; 165/35
[58] Field of Search ...................... 137/861, 885, 887; 165/35; 417/159, 181, 185, 195, 198

[56] References Cited

U.S. PATENT DOCUMENTS

| 905,818 | 12/1908 | Langford | 417/185 X |
|---|---|---|---|
| 1,527,135 | 2/1925 | Hepburn et al. | 417/185 X |
| 1,661,002 | 2/1928 | McClymont et al. | 417/185 X |
| 2,066,867 | 1/1937 | White | 417/185 |
| 2,141,427 | 12/1938 | Bryant | 417/185 X |
| 2,332,982 | 10/1943 | Blair | 417/185 X |
| 2,778,318 | 1/1957 | von Haken | 417/198 X |
| 3,166,020 | 1/1965 | Cook | 417/195 X |
| 3,666,235 | 5/1972 | Scott . | |
| 3,675,681 | 7/1972 | Obermaier . | |

OTHER PUBLICATIONS

"Vaccon Air Operated Pumps", Publication of Vaccon Company, Inc., Endicott Street, Norwood, Mass. 02062.

Primary Examiner—Gerald A. Michalsky
Attorney, Agent, or Firm—R. J. McCloskey; R. A. Johnston; E. C. Crist

[57] ABSTRACT

A valve assembly of the type providing bypass flow through a branch channel when the movable valve member is in the closed position to block flow through the main flow channel outlet. A venturi device is disposed in the main channel upstream of the movable valve member, and the venturi has secondary ports provided through the wall at the throat section. When the movable valve member is in the closed position, flow into the venturi exits at the flow ports and flows through the bypass channel. When the movable valve member is in the open position, flow discharges from the venturi, through the main channel outlet port downstream of the movable valve member, thereby causing reduced pressure at the venturi throat and preventing flow through the secondary ports to the bypass channel.

9 Claims, 6 Drawing Figures

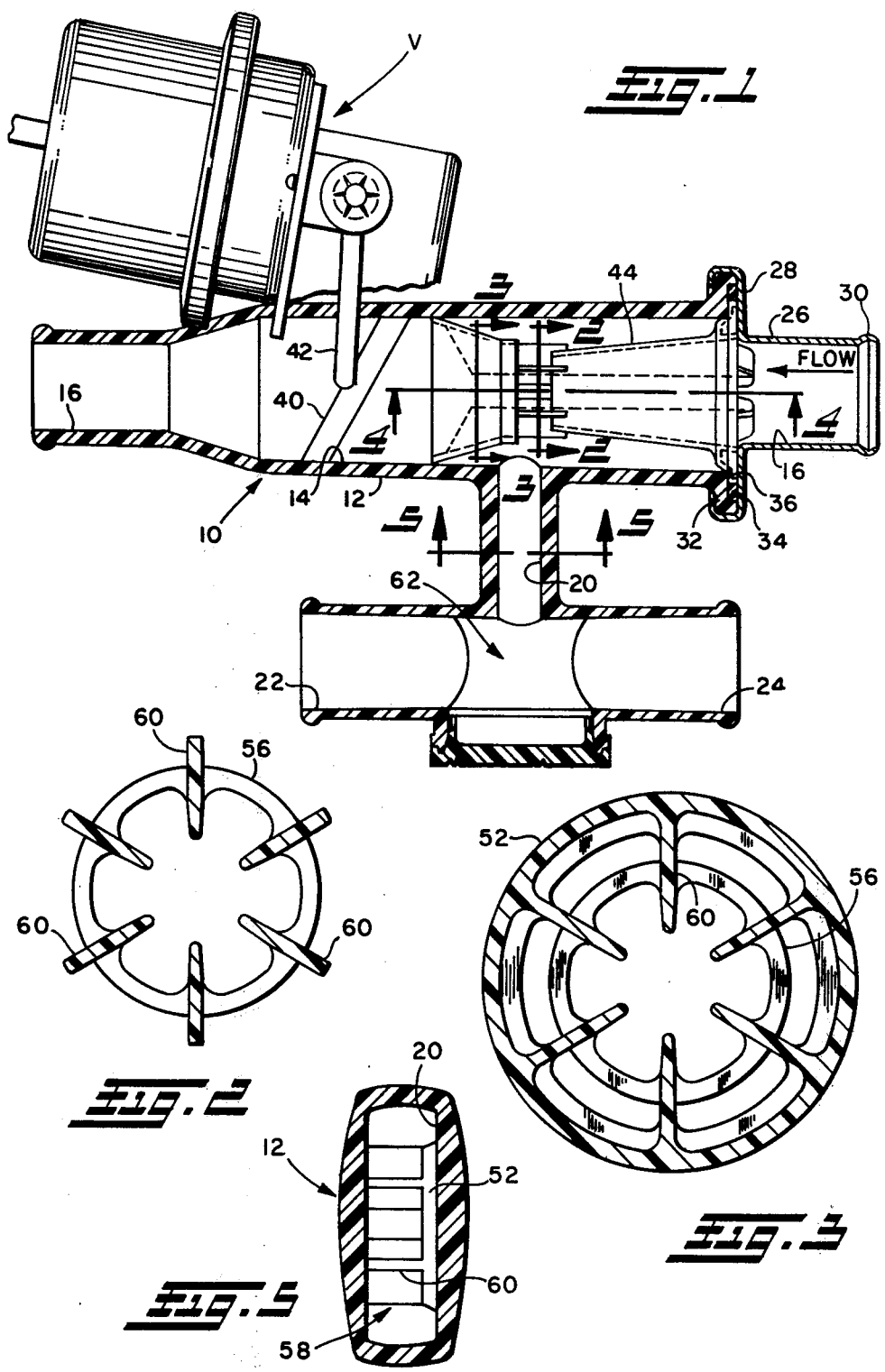

VALVE ASSEMBLY

BACKGROUND OF THE INVENTION

In applications for fluid flow temperature control valves, as for example, heater core inlet control valves for controlling the flow of engine coolant to the passenger compartment heater, it is desirable to provide continuous bypass flow when the valve is closed in order that the temperature of the fluid at the valve inlet is maintained at the engine coolant ambient. However, where a bypass or branch channel is used at the temperature control valve inlet, a problem arises in preventing bypass flow when the temperature control valve is open and it is intended that all fluid entering the control valve inlet pass through the main flow passage of the valve and not be diverted to the bypass channel.

In automotive passenger compartment temperature control systems, it is known to provide a sensor for sensing the temperature of the air in the passenger compartment and couple the sensor to an actuator which modulates the position of the heater core coolant inlet valve to vary the amount of engine coolant entering the heater core thereby controlling the temperature of the fluid in the heater core. Since the engine coolant temperature is maintained at a fairly constant value by the engine thermostat during normal engine operation, the heater core coolant inlet valve can be modulated to vary the temperature of the heater core in response to the sensor and thus operated to maintain the temperature in the passenger compartment at a substantially constant desired value.

In the above-described automatic temperature control system, it is necessary that the temperature of the coolant at the inlet of the heater core temperature control valve be maintained substantially constant in order that the valve movement in response to the sensor signals will be able to provide changes in the heater core temperature sufficiently rapidly to compensate for changes in the temperature of the passenger compartment as determined by the sensor. If the fluid supply line to the heater inlet valve comprises a single line when the heater inlet valve is closed or nearly closed, the nearly static fluid in the line from the engine to the heater inlet valve is cooled by heat transfer to the hose or connecting tube and, thus, is not maintained at the desired inlet temperature to provide rapid temperature response of the heating system.

In addition, the fluid valve can serve as an engine thermostat bypass, thereby allowing elimination of the fixed bypass and, thus, provide more coolant flow for the heater core.

In order to provide a more rapid temperature change response in the heater, in response to sensor signals, it is desirable to use a bypass type inlet valve which permits a continuous flow of engine coolant past the inlet of the valve when the valve is closed or nearly closed. However, where such a bypass or branch flow arrangement is used at the valve inlet, when the valve opens, the supply line is feeding not only the main channel through the open valve but also the bypass or branch line and, thus, the main flow channel through the temperature control valve is robbed of sufficient flow of heated fluid, which in turn decreases the temperature response capability of the heater.

When a non-bypass automotive coolant valve is shut, back pressure in the output line from the water pump is increased to 50–90 psig (340–612 Kpa) thereby increasing the load on the engine required to drive the coolant pump. A bypass type coolant valve eliminates such an increase of engine loading when the valve is closed.

Alternatively, the temperature output of heaters is often modulated by varying the position of a blend air door, which blends fully heated air with unheated air from outside the vehicle in varying proportions, either manually or by means of a servoactuator. In these cases the valve is not used to modulate the coolant flow through the heater core but it is merely an on-off device.

Since coolant is always flowing through the inlet hose to a bypass type valve, devices such as temperature sensing emission controls can be connected to the heater valve line rather than tapped into the cooling jacket of the engine block, where such devices would be generally inaccessible and subjected to a more hostile environment.

Thus, it has been desired to find a technique for employing a bypass type temperature inlet valve in a fluid temperature control system and yet provide a device which utilizes only a single valve but yet limits flow to the bypass when the temperature inlet valve is open.

SUMMARY OF THE INVENTION

The present invention provides a unique fluid inlet valve for temperature control of a fluid heating system, the type where temperatures are controlled by modulating the amount of fluid flowing through the valve in response to a control signal. The valve of the present invention is of the bypass type which permits heated fluid supply to continue to flow past the valve inlet when the valve is closed.

The present invention provides a solution to the above-described problem by providing the unique valve arrangement in which the flow to the bypass channel is prevented when the valve is in the open position.

The present invention employs a venturi, or aspirator, disposed upstream of the movable valve member at the valve inlet with the main discharge outlet of the venturi disposed to direct all discharge through the main channel of the valve passage. The secondary outlet ports are provided at the throat of the venturi and are disposed adjacent the bypass or branch channel at the valve inlet. When the fluid control valve is closed, fluid supplied under pressure to the valve inlet flows into the throat of the venturi and discharges through the secondary ports and flows through the bypass or branch outlet of the valve. When the temperature control valve is in the open position, fluid flows through the venturi and discharges through the main valve passage. The fluid flow velocity is increased at the throat of the venturi and accompanied by a decrease in pressure which prevents discharge through the secondary ports at the venturi throat, thus, preventing flow to the bypass or branch channel.

Additionally, the venturi throat can be restrictively sized so as to permit automatic bypass flow when the valve assembly is subjected to excessive inlet pressures, thereby protecting the heater core from overpressuring.

The present invention thus provides a unique solution to the problem of providing a bypass type inlet valve for an automotive heater temperature control valve and yet provides such a valve which prevents flow through the bypass channel when the valve is open without employing an additional valving member.

BRIEF DESCRIPTION OF THE DRAWING

FIG. 1 is a plan view of the valve assembly of the present invention with portions of the housing broken away to show the movable valve member and bypass flow control member.

FIG. 2 is a cross-section taken along section indicating lines 2—2 of FIG. 1 and shows the construction of the bypass control member at the throat thereof.

FIG. 3 is a view similar to FIG. 2 and shows the cross-section of the flow control member downstream of the throat.

FIG. 5 is a section view taken along section indicating line 5—5 of FIG. 1.

DETAILED DESCRIPTION OF THE DRAWING

Figure 4:
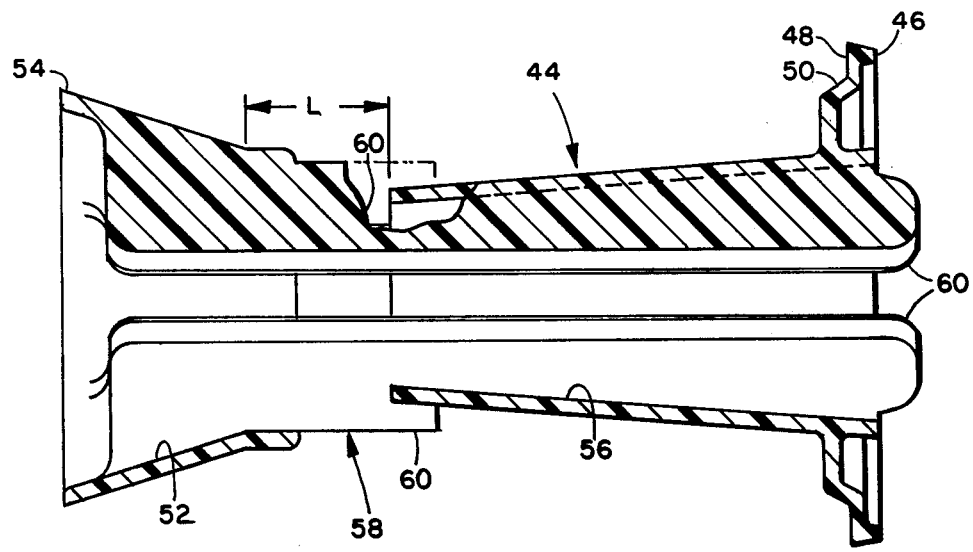
FIG. 4 is a section view taken along section indicating line 4—4 of FIG. 1 and shows the transverse configuration of the bypass flow control member in the direction of flow.

Referring now to FIG. 1, the valve assembly 10 of the present invention employs a housing means 12 which is preferably formed of plastic material capable of withstanding continuous exposure to fluid temperatures of up to 275 degrees Fahrenheit. The housing means 12 defines a main flow passage 14 having a generally straight configuration with an outlet 16 at the downstream or left end thereof in FIG. 1 and an inlet fitting 18 at the upstream or right end thereof in respect to FIG. 1. The inlet and outlet ends of the main flow passage are preferably configured to receive there over flexible hoses for connection to the coolant system of an internal combustion engine, with the inlet 18 adapted for connection to the outlet of the engine water pump and the outlet 16 adapted for connection to the inlet of the vehicle heater core.

The housing means 12 further defines a bypass or branch passage 20 which intersects and fluidly communicates with the main flow passage 14 intermediate the inlet 18 and outlet 16. The bypass channel 20 extends generally at right angles to the main flow passage 14 and terminates in a generally T-shaped fitting which defines a plurality of ports with at least one port 22 shown to the left side of the "T" fitting in FIG. 1 adapted for connection to the return line from the heater core. At least one other port 24 is provided and is disposed at the opposite or right-hand end in FIG. 1 of the "T" fitting and is adapted for connection to the return line to the engine water pump. In the presently preferred practice of the invention, the outlet fittings 22 and 24 are also adapted for receiving there over a flexible elastomeric hose and each have a slightly raised collar formed about the periphery thereof for positive sealing engagement with the interior of a flexible elastomeric hose. The inlet 18 of the main passage has a separate fitting 26 provided thereon which is preferably formed of a suitable metal, as for example steel or brass, and has a radial extending flange 28 formed on the end thereof adapted for attachment to the housing means, with a slightly raised collar 30 formed on the opposite end thereof and adapted for receiving there over in sealing engagement the inner periphery of a flexible fluid hose. The inlet end of the main passage of the housing has a flange 32 provided thereon with a resilient seal ring 34 received in a groove 36 provided in the end face of the flange. The end flange 28 of fitting 26 is received against the seal ring 34 and the outer periphery of the flange 28 is formed over the housing flange 32 in such a manner as to retain the end fitting 26 onto the housing flange and provide a fluid sealing compression of the seal ring 34 between the flanges 32 and 28.

A movable valve member 40, preferably in the form of a butterfly plate, preferably an elliptically-shaped disc, is disposed in the main flow passage 14 downstream, or to the left with respect to FIG. 1, of the bypass channel 20. In the presently preferred practice of the invention, the valve member 40 is formed of metal and has a resilient elastomeric seal provided around the periphery thereof for contacting the interior of the main passage 14 in sealing engagement. The valve member 40 is pivotably mounted by a rod member 42 which is rotatably received through the wall of the main passage 14 and has a portion thereof configured for suitable attachment thereto of an actuator as, for example, the vacuum servomotor denoted by the letter "V" in FIG. 1. The rod 42 in the presently preferred practice of the invention is formed into a right angle bend such that the portion extending exteriorly of the housing forms a crank arm for attachment of an actuator. The portion of the rod 42 extending into the main passage 14 is secured to the valve member 40 by any suitable expedient as, for example, brazing or spot welding. The arm 42 is shown in the position it assumes when valve member 40 is in the closed position.

Figure 6:
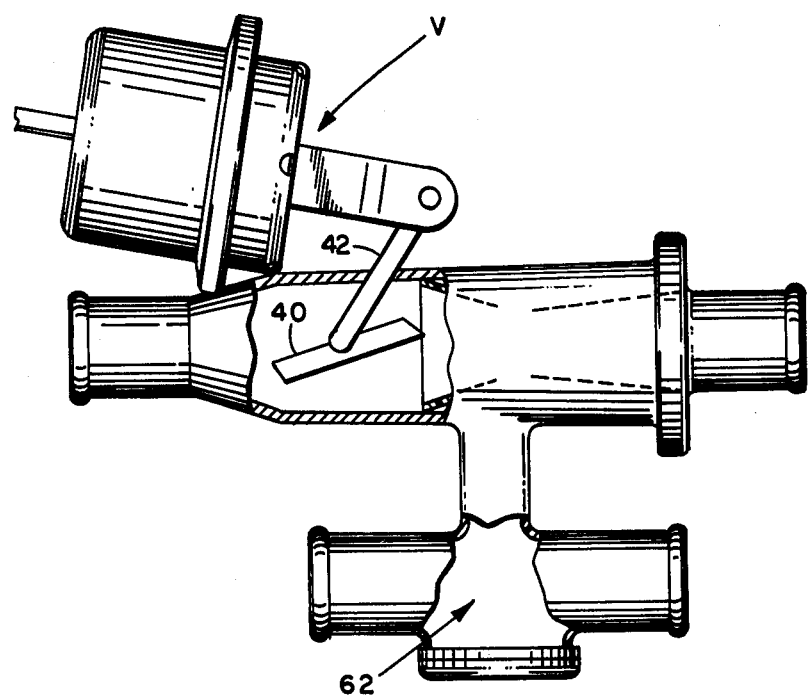
FIG. 6 shows a portion of the assembly of FIG. 1 with the movable valve member in the open position.

Referring now to FIG. 6, the valve member 40 is shown rotated to an open position and the exterior portion of the arm 42 is shown in the position it assumes with the valve member 40 open. The rod 42 is adapted for connection to any suitable type of actuating mechanism as, for example, an electrical solenoid or a fluid pressure responsive actuator as, for example, a vacuum servomotor. It will be understood, however, that where the nature of the vehicle temperature control system dictates, the actuator rod 42 may also be operated manually as, for example, by connection to a Bowden wire cable remotely operated from the vehicle dashboard.

Referring now to FIGS. 2, 3 and 4, the venturi aspirator 44 is shown in cross-section as having a radially outwardly extending flange 46 formed at the inlet or right-hand end thereof with reference to FIGS. 1 and 4 which flange has the outer periphery thereof greater than the inside diameter of the inlet end of main passage 14 such that the left-hand face 48 registers against the bottom of the groove 36 formed in the end of the housing means. Conically tapered shoulder 50 is provided on the end face 48 of the flange 46 and the shoulder 50 registers the venturi radially centralized within the right-hand end or inlet of the main passage 14.

The outlet or left-hand end of the venturi comprises a diverging nozzle 52 which terminates in a lip portion 54 which is sized for a slight interference fit with the inner diameter of the main passage 14 at a station immediately upstream of the movable valve member 40 so as to provide fluid sealing engagement with the outer periphery of the lip 54 with the inner diameter of the main passage. Thus, the venturi is assembled into the main passage 14 before installation of the end fitting 26 and the venturi is radially centralized by the discharge lip 54 and the tapered shoulder 50 on the inlet and flange. The venturi is axially positioned by the registration of end face 48 of the inlet flange of the venturi with the bottom of the groove 34 provided in the inlet end of the housing flange 32. In the presently preferred practice of the invention, the venturi aspirator 44 is formed of a suitable moldable thermoplastic material as, for example, polypropylene plastic. Thus, the lip 54 formed at the discharge end nozzle end of the venturi inherently utilizes the deformability of the plastic material to enable sealing engagement with the interior of the main flow passage 14.

With continued reference to FIGS. 2, 3 and 4, the inlet of the venturi comprises a slightly converging tubular nozzle portion 56 having a wall thickness generally thin with respect to the diameter thereof with the converging inlet nozzle 56 terminating at the throat region indicated generally at 58. The throat region of the venturi extends longitudinally the length thereof for a distance indicated by the reference letter "L" in FIG. 4, whereupon the venturi begins to diverge through the discharge nozzle 52. The discharge nozzle 52 is attached to the converging inlet nozzle 56 by a plurality of circumferentially spaced radial vanes 60 which extend generally the full length of the venturi. At the inlet end of the venturi the vanes 60 extend radially inwardly from the wall of the inlet nozzle 56 by an amount approximately equal to two-thirds of the radius of the inlet nozzle 56. The vanes 60 preferably extend a slight distance beyond the inlet flange 46 as shown in FIG. 4. In the presently preferred practice of the invention, the venturi is molded with six circumferentially equally spaced vanes 60 disposed about the periphery thereof.

With reference to FIGS. 1 and 4, the throat region of the venturi is formed by the radially extending flute 60 which attach the discharge nozzle 52 to the converging inlet nozzle 56. The spaces between the vanes 60 are left open to permit radially outward discharge between the vanes and the openings preferably extend for a distance of approximately two-thirds of the throat length "L." The vanes 60 extend in the throat region radially outwardly of the downstream end of the inlet nozzle 56 so as to join and support the wall of the discharge nozzle 52. The vanes 60 also extend longitudinally upstream of the end of the inlet nozzle 56 along the outer periphery thereof for a suitable distance to provide additional reinforcement and rigidity to the wall of the inlet nozzle in the region of termination thereof. The vanes 60 extend downstream of the throat within the discharge nozzle 52 to a region adjacent the downstream end or the greatest diameter of the discharge nozzle 52. The termination of the vanes 60 slightly upstream of the discharge end of nozzle 52 permits the formation of the somewhat resilient lip 54 around the periphery of the opening of nozzle 52 for facilitating sealing engagement of the discharge nozzle with the wall of the main fluid passage 14 as hereinabove described.

With reference particularly to FIG. 2, the radial extension of the vanes 60 inwardly and outwardly of the downstream end of nozzle 56 is clearly shown. Referring to FIG. 3, the radially inward extension of the vanes 60 is shown and the positioning of the downstream end of the inlet nozzle 56 is shown in relationship to the discharge nozzle 52. In FIG. 3 the open areas of the throat region intermediate the vanes 60 are indicated by solid black triangles. In the presently preferred practice of the invention, the vanes 60 extend radially inwardly to a common diameter and are terminated short of intersection at the longitudinal axis of the venturi. Preferably, the vanes extend inwardly to a common diameter of approximately 50 percent of the throat diameter as will be shown clearly with reference to FIG. 2.

Referring to FIG. 5, the preferred configuration of the bypass channel is shown in cross-section as elongated transversely with respect to the main flow passage 14 and the alignment of the open areas of the throat region 58 of the venturi intermediate vanes 60 are shown as disposed at a common flow station with the branch orifice 20.

In operation as pressurized fluid is applied to the inlet end of the main flow passage 14, the vanes 60 serve to break up spiral vortices in the fluid flow and to direct the flow in a more laminar state as it progresses through the inlet nozzle 52. If valve 40 is in the closed position, fluid flow is prevented in the main passage downstream any further and is prevented from backing up around the discharge nozzle 52 by virtue of the seal of lip 54 against the inner surface of the flow passage 14. As fluid pressure builds up in the discharge nozzle 52, the flow exits radially the throat region through the open areas between the vanes 60 and flows through bypass channel 20 and outwardly through turn port 24. If the main valve 40 is in the open position, as shown in FIG. 6, the fluid flows through the venturi out through discharge nozzle 52 and past main valve 40 through a main outlet 16 of the valve assembly. As the fluid flows through the throat region 58 of the venturi, the velocity of the fluid is increased and the pressure is decreased thereby preventing radial discharge outwardly from the openings in the throat region. Thus, no fluid flows through the bypass channel 20 from the venturi. However, as the pressure in the venturi throat 58 decreases, some flow from the bypass channel 20 may enter the venturi through the spaces intermediate the vanes 60.

It will be understood, for a given maximum desired coolant flow through the main passage, the venturi throat is preferably sized greater than the maximum effective flow area of the valve means or the system downstream thereof, such that overpressuring will cause increased backpressure to build up in venturi discharge nozzle 52, thereby causing automatic bypass flow through the openings in the venturi throat and protect the heater core, or other downstream device from overpressuring.

Furthermore, it will be apparent that when the pressure to the venturi inlet 56 is low enough, such that the static pressure in the throat is greater than the static pressure external to the throat, e.g. in bypass channel 20, substantial bypass flow again occurs.

In the presently preferred practice, the mixing region 62 intermediate passages 22 and 24 is sized such that its effective flow area is greater than the effective flow area of either of the ports 22 or 24.

The present invention thus provides a unique valve assembly of the bypass type which, although utilizing only one movable valve member to control flow in the main channel, operates to permit flow to a bypass channel when the main valve is closed; yet, when the main valve is fully open, substantially prevents flow from the main passage to the bypass channel. As the main valve assumes intermediate positions between fully open and completely closed, the bypass increases as the valve approaches the completely closed position. The present invention accomplishes this unique valving action by utilizing a venturi in the main channel with the outlet nozzle of the venturi sealed against the wall of the main channel. Openings in the throat region of the venturi serve to permit flow to the bypass channel when the main valve is closed; and yet, by virtue of the increased flow speed in the venturi throat, no fluid exits the openings when the main valve is open.

Modifications and variations of the present invention will be apparent to those having ordinary skill in the art and the invention is limited only by the scope of the following claims.

What is claimed is:

1. A valve assembly of the type capable of directing bypass flow through a branch channel, said assembly comprising;
   A. housing means defining
      (i) a main fluid passage with an inlet port and an outlet port communicating with said passage,
      (ii) a bypass channel branching from said main passage at a flow station intermediate said inlet and outlet ports;
   B. movable valve means disposed in said main passage downstream of said bypass channel, said valve means being movable between a first position preventing flow to said outlet port and a second position permitting flow to said outlet port, wherein said housing means defines a substantially straight cylindrical region between said inlet and said valve member; and
   C. venturi means comprising a single integral member having a converging primary inlet and a secondary port located at the throat of said venturi and a diverging outlet, said venturi means being disposed in said straight cylindrical region upstream of said valve means with the converging primary inlet thereof disposed to receive all flow from the said inlet port and the secondary port thereof disposed adjacent said bypass channel station, wherein said diverging outlet of said venturi is disposed adjacent said valve means such that flow therefrom is not permitted to flow to said bypass channel, said venturi means being operative upon said valve means being in the flow-preventing position to direct flow outwardly through said secondary port to said bypass channel and operative upon said valve means being in the fully open position to substantially prevent flow to said bypass channel, said venturi means being operative with said valve means in the intermediate position to continuously divert a portion of the flow through said main passage to said bypass channel.

2. The device defined in claim 1, wherein said venturi has said secondary port comprising at least one aperture disposed at the throat thereof.

3. The device defined in claim 1, wherein said venturi comprises a single integral member formed of polypropylene material.

4. The device defined in claim 1, wherein said venturi means includes a plurality of circumferentially spaced radial vanes extending along the length thereof in the direction of flow.

5. The device defined in claim 1, wherein
   A. said venturi means includes a plurality of circumferentially spaced radial vanes extending along the length thereof in the direction of flow; and
   B. said secondary port comprises the space intermediate said vanes for a substantial portion of the length of said throat in the flow direction.

6. The device defined in claim 1, wherein said housing means defines a flow-return channel communicating with said bypass channel at substantially right angles thereto.

7. The device defined in claim 1, wherein said housing means defines a flow-return channel intersecting said bypass channel at substantially right angles thereto and wherein the region of intersection has a greater effective flow area than the remainder of said flow-return channel.

8. The device defined in claim 1, wherein said main flow passage is substantially straight between said inlet port and said outlet port.

9. A valve assembly of the type capable of directing bypass flow through a branch channel, said assembly comprising:
   A. housing means defining
      (i) a main fluid passage having an inlet port and an outlet port communicating with said passage,
      (ii) a branch channel intersecting said main passage at a flow station between said inlet and outlet ports;
   B. a valve member disposed in said main channel between said outlet port and said branch channel intersection, said valve member being movable between a closed position blocking flow to said outlet and an open position permitting flow to said outlet port; wherein said housing means includes a substantially straight cylindrical region intermediate said inlet and said valve means; and
   C. bypass means disposed in said straight cylindrical region, said bypass means comprising an integral member having a converging inlet, a throat and a diverging outlet, said inlet and outlets each being disposed in fluid sealing contact with said main passage and with said bypass inlet being disposed to receive all flow from said inlet port, said throat having at least one secondary discharge port formed therein, said secondary port communicating with said branch channel, said bypass means being operative, upon movement of said valve member to the closed position, to cause fluid flowing through said throat to flow through said secondary port to said branch channel and said bypass means being operative upon movement of said valve member to said open position to permit only a minor portion of fluid flowing through said throat to flow through said secondary port to said branch channel.

* * * * *